United States Patent [19]

Battle

[11] 4,437,242
[45] Mar. 20, 1984

[54] FLEXIBLE GAUGE FOR INSIDE DIMENSIONS

[75] Inventor: Billy J. Battle, Birmingham, Ala.

[73] Assignee: United States Pipe and Foundry Company, Birmingham, Ala.

[21] Appl. No.: 412,427

[22] Filed: Aug. 30, 1982

[51] Int. Cl.³ .............................................. G01B 3/50
[52] U.S. Cl. ................................................ 33/178 B
[58] Field of Search ................... 33/178 R, 178 B, 179

[56] References Cited

U.S. PATENT DOCUMENTS

| | | | |
|---|---|---|---|
| 1,162,720 | 11/1915 | Hirth | 33/178 B |
| 1,514,250 | 11/1924 | Briney | 33/178 B |
| 1,529,296 | 3/1925 | Blood | 33/178 B |
| 1,547,137 | 7/1925 | Bagley | 33/178 B |
| 2,365,461 | 12/1944 | Fairbanks | 33/178 B |
| 2,556,314 | 6/1951 | Adkins | 33/178 B |
| 2,576,377 | 11/1951 | Wochos, Jr. et al. | 33/178 B |
| 2,664,642 | 1/1954 | Rae | 33/178 B |
| 2,684,536 | 7/1954 | Ahmer | 33/178 B |
| 4,211,241 | 7/1980 | Kaster et al. | 33/178 B |
| 4,216,586 | 8/1980 | Long | 33/178 B |

Primary Examiner—Richard R. Stearns
Attorney, Agent, or Firm—James W. Grace; Charles W. Vanecek

[57] ABSTRACT

An apparatus for determining whether an approximately circular opening falls within predetermined dimensions. A flexible circular gauge comprises two resilient cylinders, one partially encased inside the other. The outer diameter of the smaller cylinder equals the minimum designed diameter of the opening. The thickness of the outer cylinder is equal to one-half the predetermined tolerance in variation in the dimensions of the opening, and the entire gauge is sufficiently flexible to follow the inside walls of the opening even though they may depart from a precise circle.

3 Claims, 2 Drawing Figures

FLEXIBLE GAUGE FOR INSIDE DIMENSIONS

BACKGROUND OF THE INVENTION

1. Field of the Invention

The present invention relates to the field of measuring the inside of an opening intended to be circular. More specifically, the invention is in the field of measuring an opening which ideally would be circular but realistically will almost always deviate from a true circle. Such openings are found on cast products such as ductile iron pipe bells. These pipe bells are preferably circular but are, due to the method of their manufacture, almost always out of round or slightly oval.

2. Prior Art Device and Methods

Prior art methods include using devices for making multiple measurements of the diameter of the openings at regular angular orientation and averaging these measurements. This prior art method yields satisfactory results but is quite time consuming since it must be determined whether the average diameter falls within the specified limits. In the case of ductile iron pipe bells, the reason for limiting the inside diameter is to assure that the spigot end of the mating pipe will enter the bell and leave only a predetermined space unoccupied. This invention of a flexible "go-no go" gauge allows immediate determination as to whether an opening falls within the limits specified.

SUMMARY OF THE INVENTION

The gauge of the present invention comprises two flexible strips of resilient material formed into cylindrical sleeves, e.g., by rolling and welding. The smaller cylinder so formed should be of such outside diameter that it will barely enter the minimum allowable bell opening where both the cylinder and the bell opening are true circles. The larger of the cylinders should be of such inside diameter that the smaller cylinder will barely enter its bore and should be formed from a strip equal in thickness to one-half the total tolerance variation of the pipe bell diameter. The smaller cylinder is fastened to the larger with a portion of its length inside the larger cylinder. To faciliate manipulation of the gauge so formed, handles may be attached. A gauge so formed of sufficiently flexible material will easily deform the check out of round openings to assure that they fall within specified average diameters, i.e., the smaller portion of gauge will barely enter the smallest allowable opening and the largest portion of the gauge will enter an opening that is oversize. Thus, by using the flexible "go-no go" gauge, a quick determination of whether the opening is within the predetermined tolerance variation is made without reading numbered scales and adjusting sliding verniers.

OBJECTS OF THE INVENTION

It is an object of the present invention to provide a novel gauge which is simple in design and comprises a minimum of parts.

It is another object of the invention to provide a novel gauge with no mutual moving parts or calibrated reading dials.

These and other objects and advantages will become evident to those skilled in the art when considered in conjunction with the accompanying drawing in which like numerals indicate like elements and in which.

DESCRIPTION OF THE PREFERRED EMBODIMENT

Figure 1:
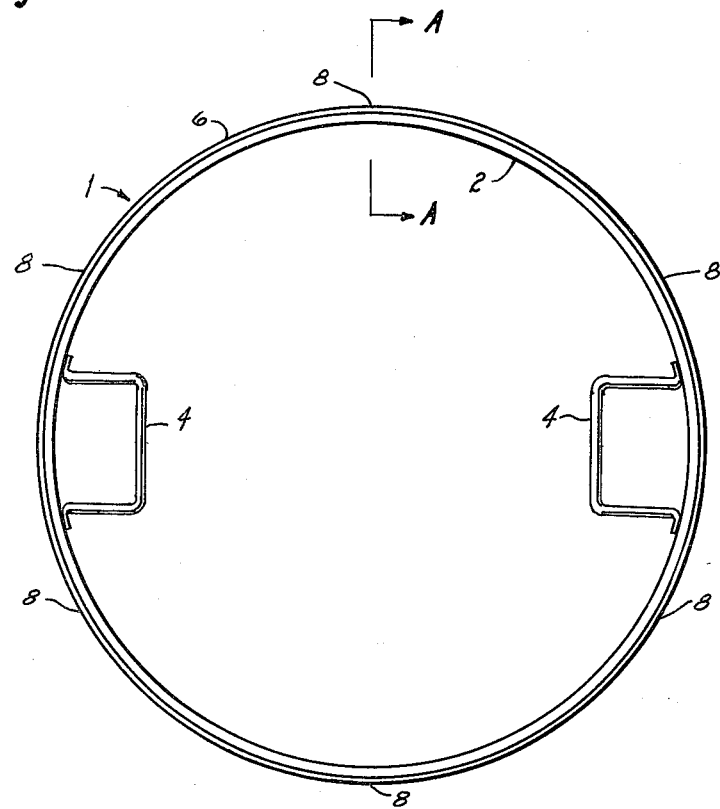
FIG. 1 is an end view of the preferred embodiment showing the gauge undeformed.
Figure 2:
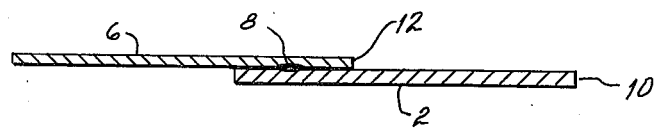
FIG. 2 is a sectional view taken along the line A—A showing the smaller cylinder positioned inside the larger.

Referring to FIG. 1, the preferred embodiment of gauge 1 is shown. The smaller or inside cylinder 2 is made of steel or other metal sufficiently thick to allow suitably flexibility without excess weight. For example, a thickness of 0.075 inch is preferred for gauges about 14 inches through about 24 inches in diameter. This thickness will be sufficiently strong to allow attachment of handles 4 and yet can be deformed to an oval shape with very little force. Handles 4 may be made of hollow tubing ½" in diameter with the ends flattened to be held against the inside surface of cylinder 2. Handles 4 may be attached by welding. It will be assumed in this example that the total tolerance variation for the circular opening is 0.1 inch. The larger or outside cylinder 6 is made of flexible steel 0.05 inch thick since the total tolerance for the diameter of the pipe bell opening being measured is 0.1 inch and this clinder must not enter the opening. The length of both cylinders is about one and one-quarter inches. The two are assembled with the smaller extending one-half inch inside the larger and spot welds 8 made at about six or more regular intervals.

The forward or leading edge of the inner cylinder of the gauge is designated 10. The forward or leading edge of the outer cylinder is designated 12.

In use the gauge is picked up by handles 4 and the leading edge 10 of the inner cylinder is placed against the circular or oval opening in the pipe bell. If the gauge will not enter the opening, the gauge indicates that the dimension of the opening is too small for its designed dimension and should be rejected. If the gauge enters the opening and the leading edge 12 prevents the gauge from fully entering the opening, the gauge indicates that the opening is within the permissible tolerance variation. If the gauge fully enters the opening so that leading edge 12 does not prevent the entrance of outer cylinder 6, the opening is outside of the permissible tolerance variation and should be rejected. The two cylinders and 2 and 6 which make up the gauge 1 are of such flexibility that a deviation of the opening from circular to oval can be accommodated.

It will be recognized that there will be required a series of gauges corresponding to the different size openings and the tolerances variations permitted.

The preferred embodiment is to be considered in all respects as illustrated and not restrictive, the scope of the invention being indicated by the appended claims.

I claim:

1. A gauge for determining the acceptance or rejection of a cylinder having a predetermined opening, said predetermined opening of said cylinder having a permissable tolerance variation from a predetermined minimum inner diameter thereof, said gauge comprising a first flexible cylindrical sleeve and a second flexible cylindrical sleeve, said first flexible cylinder forming a partial interior liner for said second flexible cylindrical sleeve and being attached to said second flexible cylinder in an underlying relationship, said first flexible cylindrical sleeve having an outer diameter equal to the minimum permissible inner diameter of said opening in said cylinder and said second flexible cylindrical sleeve having a thickness equal to one-half the permissible tolerance variation of said opening in said cylinder.

2. The gauge of claim 1 wherein handles are attached to said first flexible cylindrical sleeve.

3. The gauge of claim 2 in which said handles are diametrically opposed.

* * * * *